United States Patent [19]

Chane-Ching et al.

[11] Patent Number: 4,822,580

[45] Date of Patent: Apr. 18, 1989

[54] PRODUCTION OF STANNOUS SALTS

[75] Inventors: Jean-Yves Chane-Ching; Jean-Yves Dumousseau, both of Paris, France

[73] Assignee: Rhone-Poulenc Specialites Chimiques, Courbevoie, France

[21] Appl. No.: 178,891

[22] Filed: Apr. 5, 1988

Related U.S. Application Data

[63] Continuation of Ser. No. 884,915, Jul. 14, 1986, abandoned.

[30] Foreign Application Priority Data

Jul. 12, 1985 [FR] France .................................. 85 10709

[51] Int. Cl.$^4$ ...................... C01B 35/06; C01B 17/96
[52] U.S. Cl. .................................... 423/293; 423/494; 423/544; 502/326
[58] Field of Search ........... 423/293, 494, 544, 648 R, 423/657; 502/326

[56] References Cited

U.S. PATENT DOCUMENTS

| | | | |
|---|---|---|---|
| 2,726,929 | 12/1955 | Richter | 423/544 |
| 2,868,623 | 1/1959 | Vittands | 423/494 |
| 2,924,508 | 2/1960 | Gilliland et al. | 423/489 |
| 3,053,621 | 9/1962 | Horvitz | 423/494 |
| 3,161,465 | 12/1964 | Horn et al. | 423/494 |

OTHER PUBLICATIONS

Aesar Catalogue pp. 245–247.

Primary Examiner—Asok Pal
Attorney, Agent, or Firm—Burns, Doane, Swecker & Mathis

[57] ABSTRACT

Stannous salts of a non-oxidizing anionic acid, e.g., stannous fluoborate or stannous sulfate, are prepared by reacting metallic tin with a preferably aqueous solution of such acid in the presence of a catalytically effective amount of finely divided catalyst particles, e.g., comprised of a precious metal, said catalyst particles providing hydrogen release at low overvoltages.

20 Claims, No Drawings

PRODUCTION OF STANNOUS SALTS

This application is a continuation of application Ser. No. 884,915, filed Jul. 14, 1986, now abandoned.

BACKGROUND OF THE INVENTION

1. Field of the Invention

The present invention relates to the production of solutions of stannous salts, and more especially, to the production of aqueous solutions of stannous fluoborate and stannous sulfate.

2. Description of the Prior Art:

Certain solutions of stannous salts, such as the fluoborate and sulfate, are especially industrially useful, in particular for the electrolytic deposition of metallic tin.

The preparation of these stannous salts is currently carried out by processes entailing successive transformations of metallic tin into the chloride thereof by the action of hydrochloric acid in the presence of an oxidizing agent, e.g., chlorine, then into the oxide SnO by treating the stannous chloride with a solution of sodium carbonate, the stannous oxide ultimately being dissolved in fluoboric or sulfuric acid. These processes have the disadvantage of including different successive operations involving product losses and resulting in products which may have high contents of stannic tin.

It is also known to this art that some stannous salts can be prepared by simple attack of the metallic tin with the corresponding acid. The disadvantage of these processes are the slow kinetics and the slow rate provided thereby. It is furthermore known that the speed of reaction can be considerably improved by adding oxygen to the reaction medium. This, however, requires the use of a second reactor in which the stannic tin formed is reduced by passing the tin solution over the metallic tin in a reducing or inert atmosphere. See U.S. Pat. No. 3,432,256.

Also known to this art are a number of electrolytic processes for the production of stannous salts. Compare U.S. Pat. Nos. 3,300,397 and 3,795,595; French patent No. 2,338,900. Such processes are difficult to implement, as a practical matter.

SUMMARY OF THE INVENTION

Accordingly, a major object of the present invention is the provision of an improved process for the production of solutions of stannous salts, which improved process is conspicuously devoid of those disadvantages and drawbacks to date characterizing the state of this art, and which directly and simply provides such solutions in a form having all characteristics as to be adopted for standard uses, e.g., a high total tin content and low contents in stannic tin and residual acidity.

Briefly, the present invention features the production of a solution of stannous salts of a non-oxidizing anionic acid from metallic tin, by reacting tin metal with a solution of a non-oxidizing anionic acid in the presence of finely divided particles of a material which provides hydrogen release at low overvoltages and which serves as a catalyst.

DETAILED DESCRIPTION OF THE PREFERRED EMBODIMENTS OF THE INVENTION

More particularly according to the present invention, the subject process enables the direct obtainment of solutions of stannous salts having low contents in stannic salts and which are well adapted for practical commercial usage.

Furthermore, the reaction sequence of the subject process has satisfactory kinetics, even in a weak acid reaction medium. The process according to the invention offers the advantage of permitting the direct preparation of solutions having low free acidity.

It should be furthermore noted that solutions of tin salts with non-oxidizing anionic acids offer a substantial economic advantage. Representative non-oxidizing anionic salts include stannous chloride and fluoride, but, above all, stannous fluoborate and sulfate offer the greatest industrial interest.

The acid solution is typically an aqueous solution, although other solvents are envisaged, including a mixture with water.

From the point of view of reaction kinetics, the acid solutions used should preferably be concentrated solutions. In practice, however, the acid concentration is advantageously regulated such as to provide a solution of stannous salt corresponding to a concentration approximating maximum solubility at 20° C. or conforming to commercial specifications. Thus, fluoboric acid solutions of from 4 to 8 M and sulfuric acid solutions of from 0.1 to 2 M, preferably from 1 to 1.7 M, are advantageously used.

The metallic tin can be in the form of tin powder (average particle size varying, e.g., from 0.5 $\mu$m to 3 mm) or in granular form, i.e., particles of irregular shape having a relatively large specific surface area. From a kinetic point of view, it is preferred to use fine powders, although in practice granules can be used perfectly well.

The metallic tin is advantageously used in excess, relative to stoichiometry. This excess may range from 0.1 to 100%. Such an excess makes it possible to control the stannic tin content of the solution to a minimum.

By the term "material providing hydrogen release at low overvoltages" is intended a material providing for hydrogen release at overvoltages below 100 mV, determined for low current densities on the order of 1 mA $cm^{-2}$.

These materials are preferably precious metals, in particular, platinum, palladium, and ruthenium. However, any material characterized by providing hydrogen release at low overvoltage and inert in acid media can be used.

The precious metals, in finely divided particle state, are advantageously placed onto an electrically conductive support having a large specific surface area, advantageously greater than 600 m$^2$/g. This support may in particular be active carbon. Active carbon impregnated with platinum is preferred and in particular active carbon impregnated with ruthenium, for economic reasons. These active carbons may contain up to 5% by weight of precious metal in relation to the total precious metal/carbon weight.

The catalyst is advantageously used in amounts corresponding to a weight ratio of $4 \times 10^{-5}$ to $2 \times 10^{-3}$ in relation to the weight of tin produced and preferably $10^{-4}$ to $6 \times 10^{-4}$ in relation to the weight of tin produced.

Furthermore, it has been noted that, in practice, the catalyst retains its catalytic activity and properties after use. It can thus be recycled over several cycles, which makes it possible to greatly reduce the extra expense theoretically involved in the use of an expensive catalyst.

All of the reagents can be mixed from the start of the operation. It is also possible to mix only a part of the acid with all of the tin and catalyst and to continuously add the remainder, or add it incrementally over the course of the reaction.

The reaction temperature advantageously ranges from 40° to 90° C., preferably from 70° to 90° C.

The reactive mixture is advantageously agitated in order to stimulate the reaction.

Under agitation, the reaction time typically varies from 2 to 48 hours. Preferably, it ranges from 5 to 24 hours.

Of course, the process according to the invention can be carried out either continuously or discontinuously.

In order to further illustrate the present invention and the advantages thereof, the following specific examples are given, it being understood that same are intended only as illustrative and in nowise limitative.

EXAMPLE 1

Into a cylindrical Teflon reactor having a capacity of 300 ml, there were introduced 80 g of powdered tin, consisting of particles having a mean equivalent diameter of approximately 0.2 mm, 0.150 l of 50% fluoboric acid having a density of 1.4 g and 900 mg active carbon containing 5% ruthenium and 50% humidity (marketed by Engelhard).

The mixture was maintained under agitation and at a temperature of 80° C. for a period of 24 hours. After filtration, a clear solution having a density of about 1.6 was obtained; its chemical composition was determined by iodometric titration of tin (II) and by interpretation of the neutralization curve for $OH^{31}$ ions, according to the method described in GALVANO TECHNIK, 66 No. 10, pp 811–819 (1975). The following table reports the principal characteristics of the product solution:

TABLE I

| | |
|---|---|
| $Sn^{2+}$ | 380 g $l^{-1}$ |
| $Sn^{4+}$ | 15 g $l^{-1}$ |
| free $HBF_4$ | 0.6 M |
| free $H_3BO_3$ | 0.7 M |

Neither emission by arc spectrography nor X-ray fluorescence analysis evidenced the presence of ruthenium, thus demonstrating ruthenium contents below 10 ppm.

COMPARATIVE EXAMPLE 1

The procedure of Example 1 was repeated, but without adding catalyst to the reaction mixture.

The concentration of tin (II) was only 75 g $l^{-1}$ after 24 hours.

This example clearly evidences how slow the kinetics of reaction are, in the absence of the catalyst and the impossibility of obtaining industrially useful solutions without a catalyst.

EXAMPLE 2

The solid residue collected by filtration in Example 1 was dried at ambient temperature for 48 hours. After this drying operation, the solid residue was reintroduced into the reactor, together with 57 g tin in powder form (10 μm) and 150 ml of 50% fluoboric acid.

The reaction mixture was maintained at 80° C. and agitated for 24 hours. After filtration, a clear solution was obtained having a concentration in $Sn^{2+}$ of about 360 g$l^{-1}$.

The solid residue collected was dried at ambient temperature for 48 hours.

After drying, the solid residue collected was reintroduced into the reactor, together with 54 g tin in powder form (10 82 m) and 150 ml of 50% fluoboric acid.

The reaction mixture was maintained at 80° C. and agitated for 24 hours. The clear solution collected after filtration had a concentration in $Sn^{2+}$ of about 340 g$l^{-1}$. This example evidences the possibility of recycling the active carbon impregnated with precious metals, which at the same time retains its catalytic properties.

EXAMPLE 3

Into a cylindrical teflon reactor having a capacity to 300 ml, there were introduced 80 g tin in powder form (mean equivalent diameter of 10 μm), 0.150 ml of 54% fluoboric acid, and 450 mg active carbon comprising 5% Pt (marketed by Engelhard). The mixture was agitated at a temperature of 80° C. for 24 hours. After filtration, a clear solution having a density approximating 1.6 was obtained; the chemical composition of this solution was determined by iodometric titration of tin (II) and by interpretation of the neutralization curve for ions $OH^-$ by the aforesaid method.

The following table reports the principal characteristics of the product solution:

TABLE II

| | |
|---|---|
| $Sn^{2+}$ | 430 g $l^{-1}$ |
| $Sn^{4+}$ | 15 g $l^{-1}$ |
| free $HBF_4$ | 0.5 M |
| free $H_3BO_3$ | 0.7 M |

Analysis of the platinum by arc spectrophotometry, and X-ray fluorescence analysis, of the solution obtained, evidences no significant presence of platinum (Pt <10 ppm).

EXAMPLE 4

Into a double-envelope Pyrex glass reactor having a capacity of one liter, there were introduced 150 g tin in powder form (mean equivalent diameter of 10 μm), one liter of 1.125 M sulfuric acid and 13.3 active carbon impregnated with ruthenium, having a 5% ruthenium content at 50% humidity.

The apparatus was equipped with an agitator system and refrigerating column, and was maintained under agitation at 80° C. for 24 hours. The mixture was allowed to cool to ambient temperature. The solution obtained was then filtered.

Iodometric titration of tin (II) evidenced a content of 122 g $l^{-1}$. Polarographic analysis on mercury electrode evidenced a $Sn^{+4}$ content of about 6 g$l^{-1}$. The residual acid titrated by soda after chelation of $Sn^{2+}$ ions by oxalate ions evidenced a value of about 9 g$l^{-1}$ $H_2SO_4$.

To an aliquot fraction, tert-butylpyrocatechol was added at a rate of 1 g$l^{-1}$ of solution. The solution thus stabilized was kept away from light. After three months the solution had a concentration in $Sn^{2+}$ of 120 g$l^{-1}$.

While the invention has been described in terms of various preferred embodiments, the skilled artisan will apprecite that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a stannous salt of a non-oxidizing anionic acid, comprising reacting metallic tin with a solution of a non-oxidizing anionic acid in the presence of a plurality of catalyst particles which increase the reaction rate compared to a non-catalyzed reaction, said catalyst particles providing hydrogen release at low overvoltage, wherein the anion formed by said anionic acid comprises a halogen ion, fluoborate ion or sulfate ion, and wherein said catalyst particles comprise platinum, palladium or ruthenium.

2. The process as defined by claim 1, further comprising filtering a solution of said stannous salt from the medium of reaction.

3. The process as defined by claim 1, said catalyst particles comprising an electrically conductive support having a large specific surface area.

4. The process as defined by claim 3, said support including active carbon.

5. The process as defined by claim 4, said catalyst particles comprising active carbon impregnated with up to 5% by weight platinum or ruthenium.

6. The process as defined by claim 1, wherein the metallic tin comprises tin powder or tin granules.

7. The process as defined by claim 1, wherein the non-oxidizing anionic acid solution is a concentrated solution providing maximum solubility of the stannous salt at 20° C.

8. The process as defined by claim 1, said non-oxidizing anionic acid comprising fluoboric acid.

9. The process as defined by claim 1, said non-oxidizing anionic acid comprising sulfuric acid.

10. The process as defined by claim 1, wherein the metallic tin present in stoichiometric excess.

11. The process as defined by claim 1, wherein said catalyst is present in a weight ratio of $4 \times 10^{-5}$ to $2 \times 10^{-3}$ relative to the weight of tin produced.

12. The process as defined by claim 11, said ratio ranging from $10^{-4}$ to $6 \times 10^{-4}$.

13. The process as defined by claim 1, wherein the reaction temperature ranges from 40° to 90° C.

14. The process as defined by claim 13, wherein the reaction temperature ranges from 70° to 90° C.

15. The process as defined by claim 13, wherein the reaction time ranges from 2 to 48 hours.

16. The process as defined by claim 1, said stannous salt comprising stannous chloride, stannous fluoride, stannous fluoborate or stannous sulfate.

17. The process as defined by claim 1, said acid solution comprising an aqueous acid solution.

18. The process as defined by claim 8, wherein said fluoboric acid is present in solution in an amount of from about 4 M to about 8 M.

19. The process as defined by claim 1, wherein said non-oxidizing anionic acid comprises sulfuric acid, and wherein said sulfuric acid is present in solution in an amount of from about 0.1 M to about 2 M.

20. The process as defined by claim 19, wherein said sulfuric acid is present in solution in an amount of from about 1 M to about 1.7 M.

* * * * *